Figure 1:
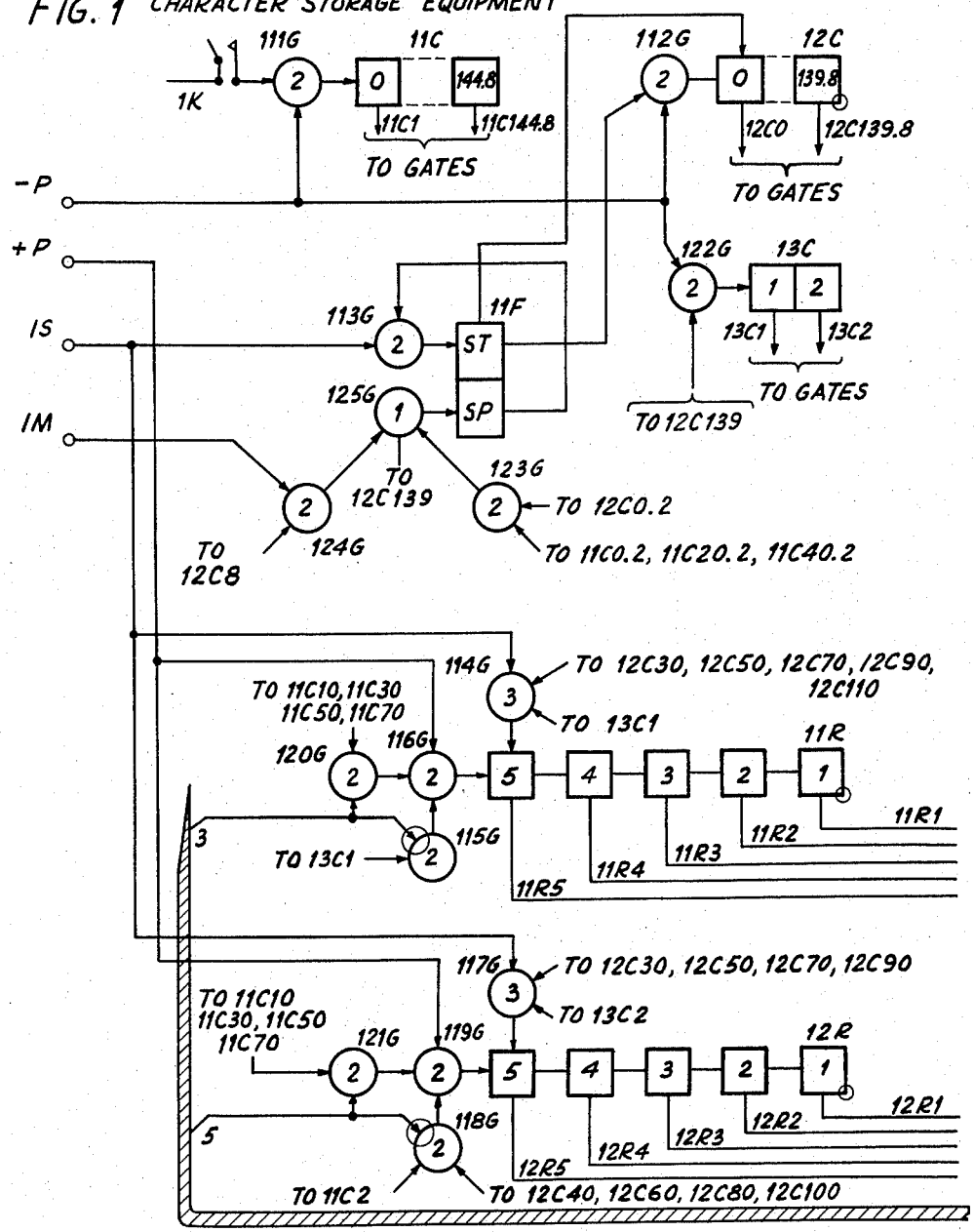

Dec. 22, 1959     E. P. G. WRIGHT     2,918,526
ELECTRIC TELEGRAPH SYSTEMS
Filed Nov. 26, 1954     7 Sheets-Sheet 1

FIG. 1 CHARACTER STORAGE EQUIPMENT

INVENTOR.
E. P. G. WRIGHT
BY Robert Harding Jr.
ATTORNEY

CHECK ELEMENT DERIVATION EQUIPMENT

Dec. 22, 1959   E. P. G. WRIGHT   2,918,526
ELECTRIC TELEGRAPH SYSTEMS
Filed Nov. 26, 1954   7 Sheets-Sheet 3

CODE TRANSMITTER CONTROL

INVENTOR.
E. P. G. WRIGHT
BY Robert Harding Jr.
ATTORNEY

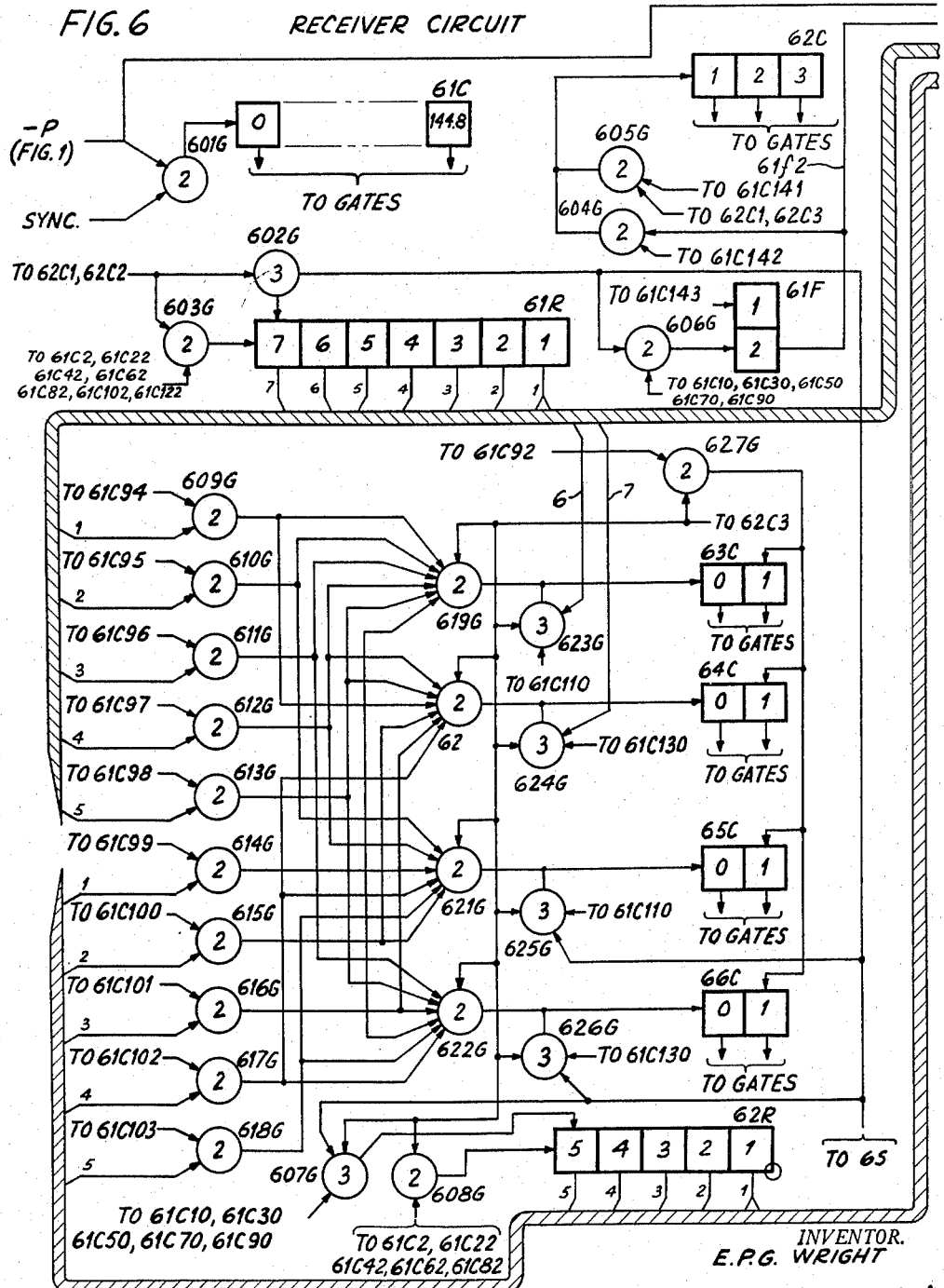

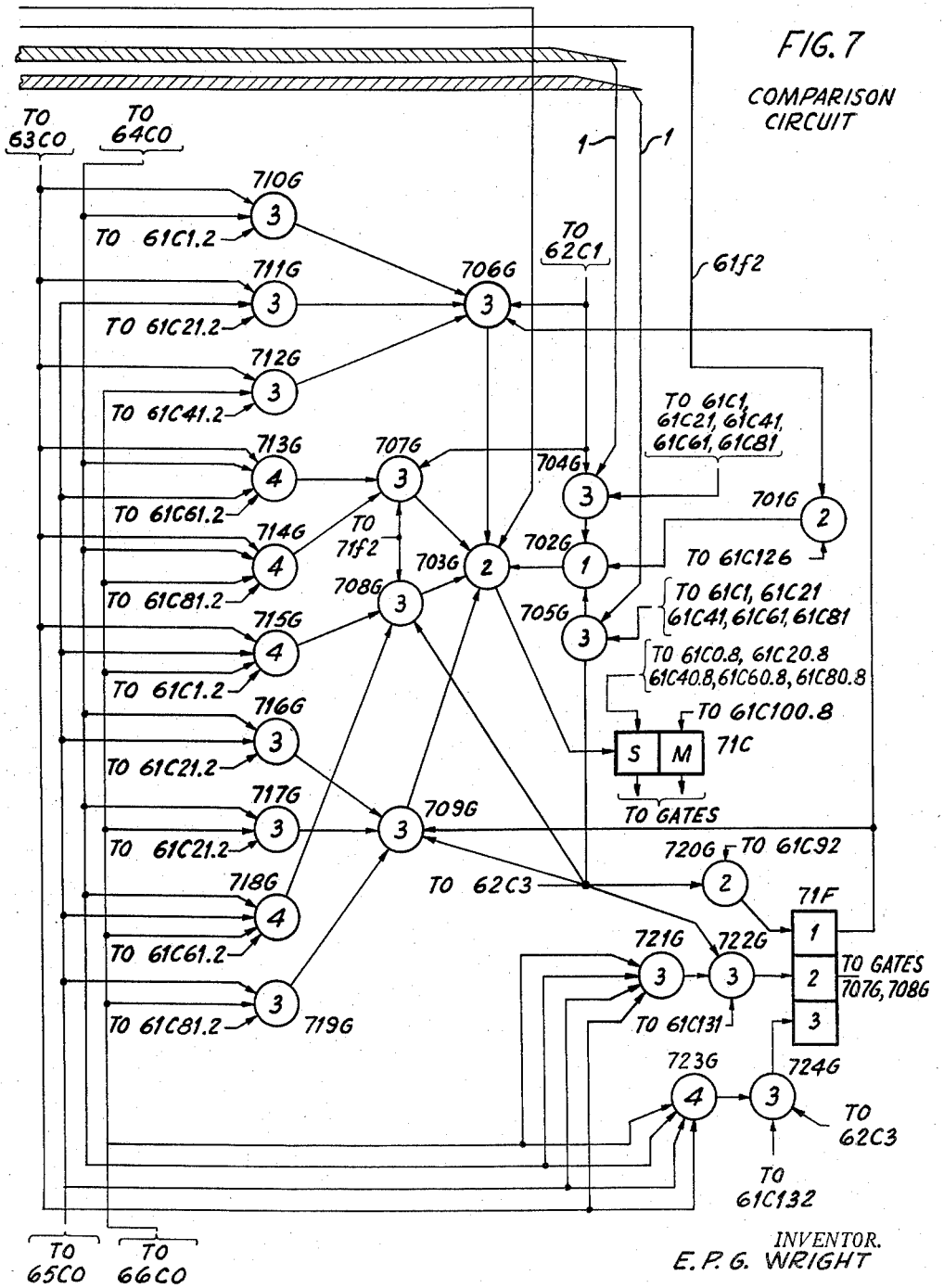

United States Patent Office 2,918,526
Patented Dec. 22, 1959

2,918,526
ELECTRIC TELEGRAPH SYSTEMS

Esmond Philip Goodwin Wright, London, England, assignor to International Standard Electric Corporation, New York, N.Y., a corporation of Delaware Application November 26, 1954, Serial No. 471,442

8 Claims. (Cl. 178—23)

This invention relates to electric telegraph systems and similar signalling systems using two signalling conditions only, called, in the case of telegraphy, mark and space, and is an improvement in or modification of the invention claimed in U.S. Patent No. 2,653,996, granted September 29, 1953, hereinafter called the parent patent.

Telegraph systems are known in which the code combinations used are such that an incorrectly received combination can readily be detected and either a printed indication be made that a character is incorrect and/or a request for repetition of the signal combination be automatically sent back to the transmitter.

One form of code for such a system is one in which the ratio of marks and spaces in each combination is always the same so that a departure from this ratio in the received combination indicates an error i.e. some interference in the transmission path.

In the parent patent there is described and claimed a telegraph system using combinations of two signalling conditions only (mark and space) which comprises at a transmitting station means for deriving from a plurality of signal combinations a plurality of check elements the kind (mark and space) of each of which expresses the relation between the marks and spaces contained in a set of elements in said signal combinations which set is different for each check element, means for transmitting the said signal combinations and the said check elements and at a receiving station means for automatically determining the relation between the marks and spaces in sets of elements of the received combinations corresponding to those of the transmitted combinations from which the respective check elements were derived and for automatically correcting an element of the said received combinations in accordance with discrepancy between the relations so determined and the received check elements.

In the embodiment described in the parent patent the five significant elements of each teleprinter code combination were translated into the known form of code combination of seven elements, each such code combination having a contant ratio of marks and spaces. Thus any particular received code combination in which the ratio of marks and spaces differed from the given constant ratio was recognised as being erroneous. From each $n$ signal combination, specifically five signal combinations, a new signal combination of check elements was derived, each element in the new signal combination expressing the relation between the marks and spaces contained in the elements in corresponding positions in the five signal combinations. The new signal combination was transmitted and as received compared with a combination similarly derived from the five signal combinations as received. This comparison served to denote which element in an incorrectly received signal combination was erroneous and was used to effect an automatic correction. Thus errors could be corrected without any request for repetition.

It is the object of the present invention to provide a system which, whilst utilising the invention of the parent patent, will be more economical both in apparatus and in transmission time than the system described in the above application.

According to the present invention the check elements are divided between the signal combinations from which they have been derived and each signal combination that is transmitted comprises elements equal in number to and dependent upon the significant elements of a received signal combination together with the check elements allocated thereto by said division.

In a preferred embodiment as applied to the well known start-stop code combinations each consisting of a start element, a combination of five significant elements indicating a character and a stop element, the five significant elements of two successive start-stop combinations are stored, four check elements are prepared, and two are added to each combination of five significant elements to make up seven element combinations. These seven element combinations are then transmitted over a synchronous transmission system, received and stored, any errors in the original five unit portion of the combination automatically corrected, and the corrected five unit code combinations, each preceded by a start element and succeeded by a stop element sent on to a receiving teleprinter.

This system presents the following advantages:

(a) It is only necessary to store two characters at the transmitter or receiver.

(b) The system can work directly to and from teleprinters.

(c) There is no translation of the five unit code combinations, so that the apparatus and circuits involved are simplified.

Figure 2:
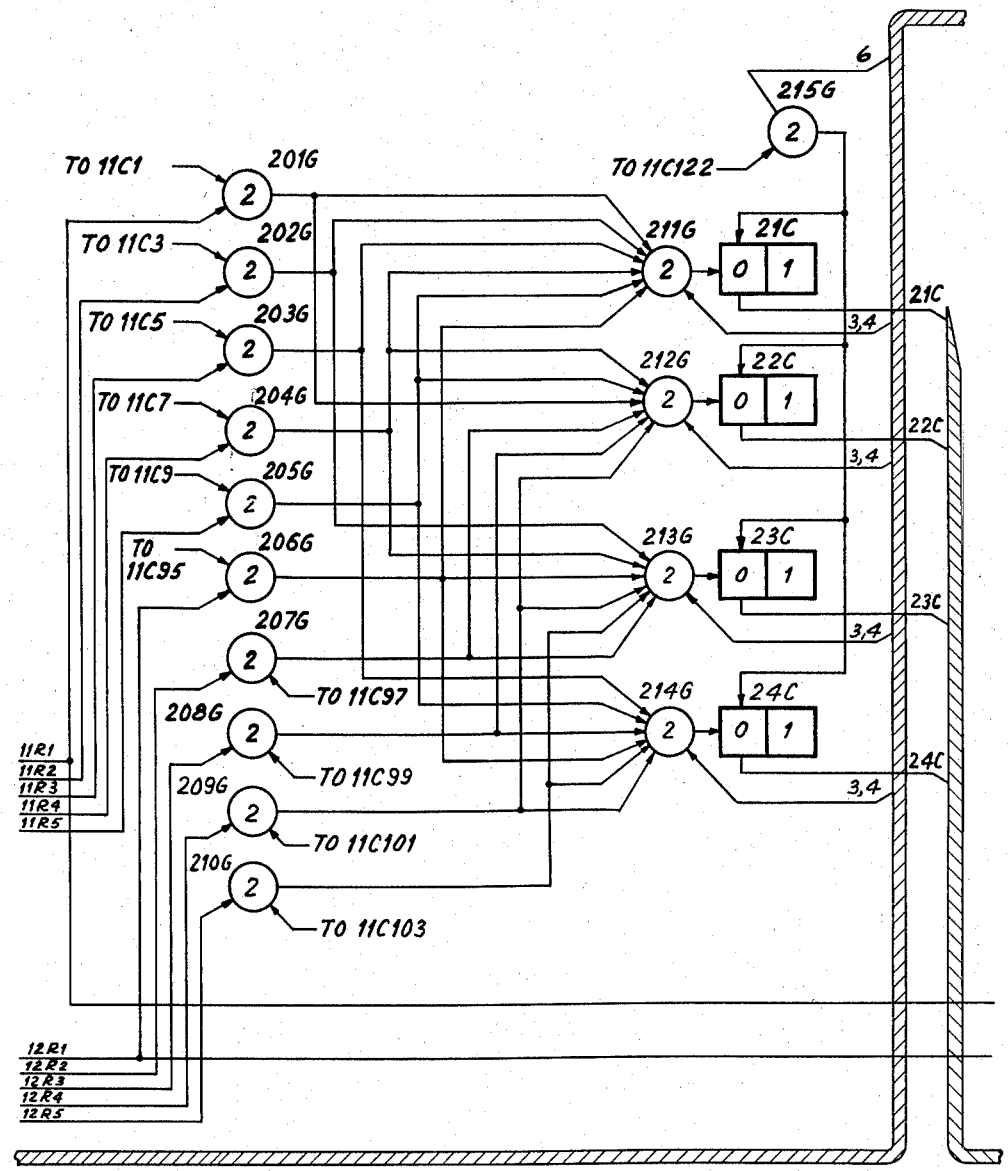
Figure 3:
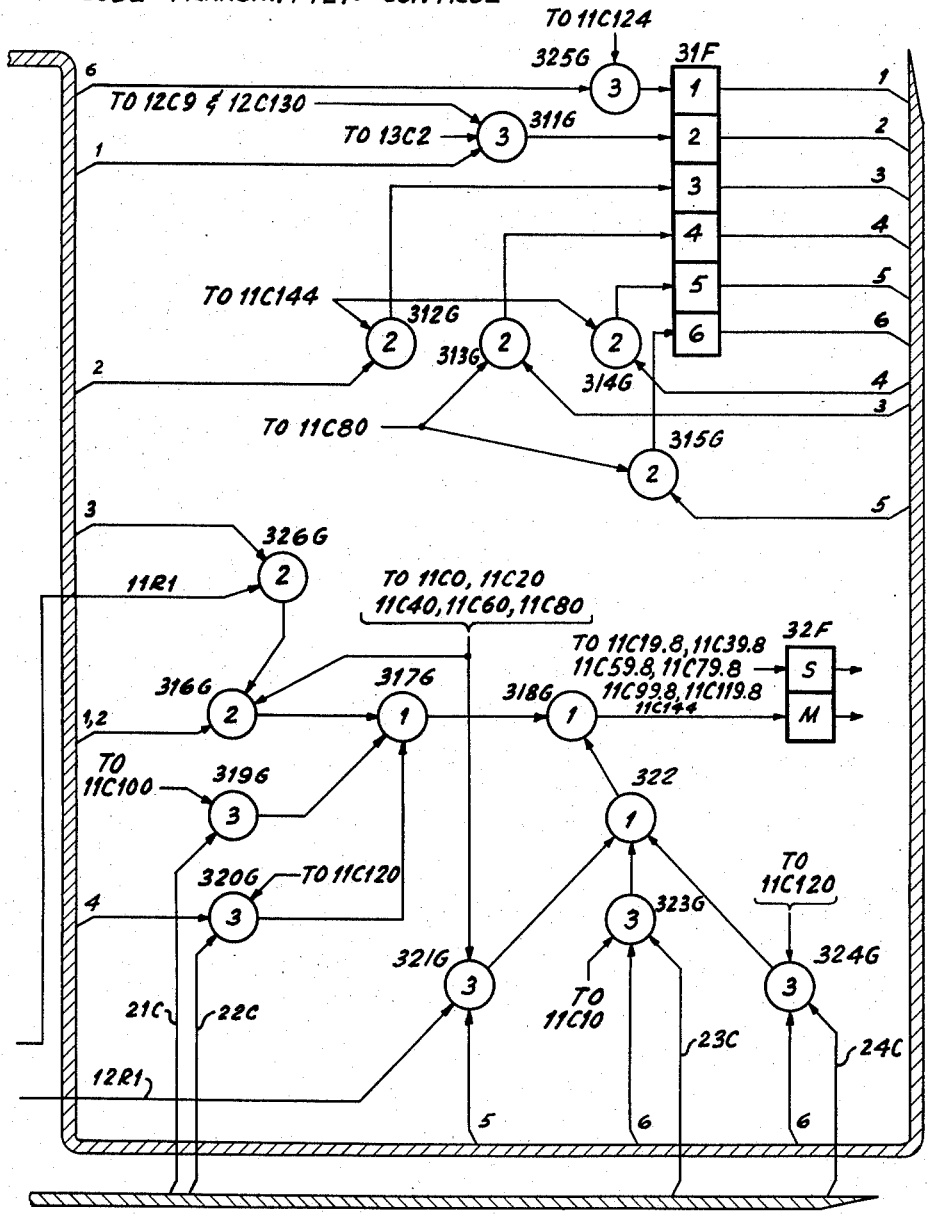
Figure 4:
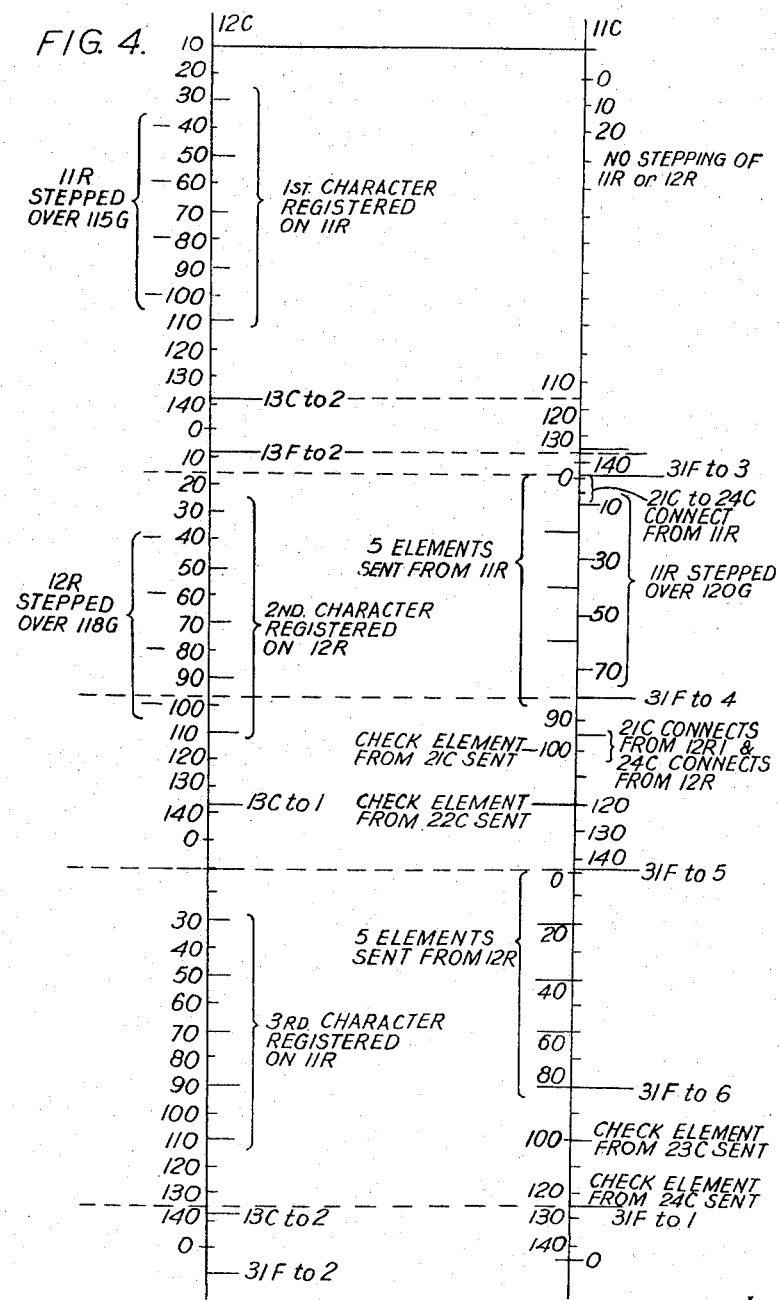
Figure 5:
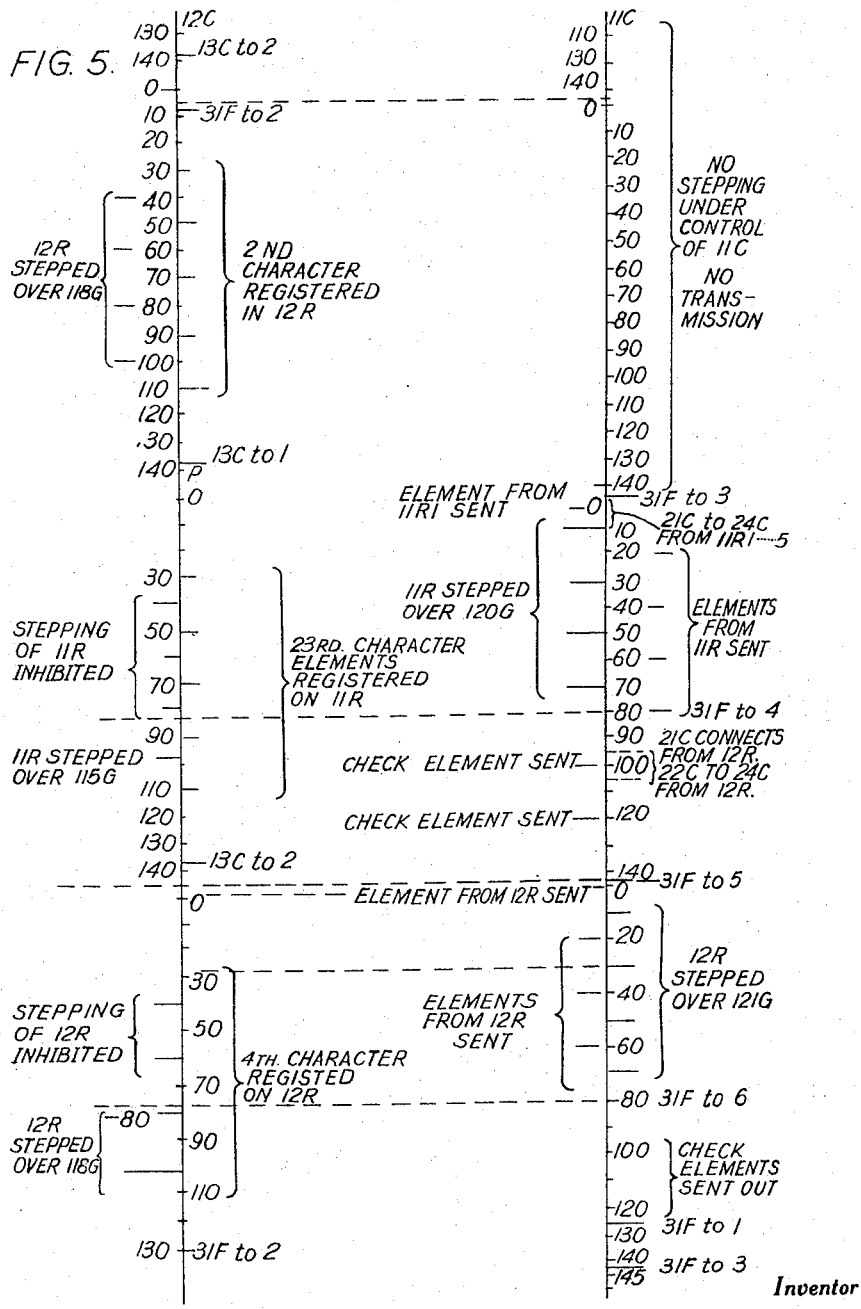

An embodiment of the invention will now be described in conjunction with the accompanying drawings in which:

Figs. 1, 2 and 3 together constitute a single circuit diagram in which,

Fig. 1 shows a circuit for receiving and storing characters from a teleprinter including a time scale circuit and a second time scale circuit for controlling a synchronous transmission channel, Fig. 2 shows circuits for deriving check elements from the stored characters, Fig. 3 shows a circuit for controlling transmitted code combinations, Figs. 4 and 5 are timing diagrams illustrating the operations of Figs. 1 to 3, Figs. 6 and 7 together constitute the receiver of a synchronous channel and a transmitter of start stop signal combinations; of these Fig. 6 shows the circuits for receiving and storing combinations from the synchronous channel and Fig. 7 shows comparison circuits for check elements and the means for controlling the transmission of corrected start stop combinations.

These drawings are functional in character, each symbol used standing for a device performing a particular function, the physical nature of the device and its manner of performing the function being known. The reference characters for the various symbols have been allotted in such a manner as to denote the particular figure of the drawings upon which each appears. Each reference character consists of a number and a letter. The first digit of the number indicates the figure of the drawing, thus 111G and 11R indicate that the symbols so denoted appear on Fig. 1, 21C and 201G on Fig. 2 and so on.

The letter C as part of a reference numeral indicates a counting circuit; the counting circuit may consist of two or more elements. Thus there are two multi-element counting circuits denoted 11C and 12C in Fig. 1 and another multi-element counting circuit 61C in Fig. 6. Each of these counting circuits may take the form of that shown and described in U.S. Patent No. 2,787,657, issued April 2, 1957 and comprising multi-gap cold cathode electric discharge tubes which count pulses applied thereto from a source marked —P in the drawings, these pulses being applied at a repetition rate of 5,000 kc./s.

As described in the last mentioned patent, circuits are provided for connecting the outputs of the counting tubes through various gates to conductors upon which potentials are required to appear at various times during the cycle of the counting circuit. In the accompanying drawings these gates are omitted in order to simplify the circuits. Instead various conductors are identified with the reference character of the counting chain with the letter in the lower case and with the times in milliseconds after the start of that counting chain at which a potential appears on the conductor in question.

The time scale circuit constituted by the counting chain 11C in Fig. 1 is continuously running so long as pulses are applied thereto and runs from time 0 to 144.8 milliseconds and then again returns to zero.

The time scale circuit 12C in Fig. 1 runs from zero to 139.8 milliseconds and then, as indicated by the small circle in the right-hand corner of the symbol, stops until it is reset either to zero or some intermediate point.

The time scale circuit 61C is exactly similar to 11C being continuously running.

Other counting circuits contain two elements only, as 13C or three elements only as 62C and are cyclic.

Gate circuits are shown as a circle with a numeral within it, this numeral denoting the number of inputs required to open the gate. Input conductors to the gate and output conductors from the gate are shown with arrows directed to and from the circle respectively. Input conductors are denoted by reference characters indicating the counting circuit or switch circuit from which potentials are derived. A small circle surrounding the arrow head of an input conductor to the gate indicates that when potential appears upon that conductor the opening of the gate by potential on any other input conductors is prevented. Gate circuits of this kind are well known in the art and are described, for example, in the U.S. Patent 2,653,996, previously referred to.

The meaning of other symbols will become clear as the operation of the circuits is described and are fully explained in the said parent patent.

The operation of the circuits is as follows:

The time scale circuit 11C is started into operation by closing the key 1K. The gate 111G thus permits pulses to pass to the time scale counting circuit 11C from —P.

*Examination of incoming signal combination from a teleprinter*

Start-stop combinations are received from a teleprinter over a two wire line (not shown), and are applied to a modulator in the manner described in the U.S. Patent 2,787,657 above referred to. The modulator causes, as therein described, positive pulses from the same source as that supplying the conductors marked —P to appear either on the conductor 1M or on the several conductors 1S according as either a mark or a space is received from the teleprinter. With no signals being received the condition of the line from the teleprinter is mark, and pulses are present on conductor 1M but these have no effect except as later described as there is initially no potential on the other input conductor labelled "12C8" leading to gate 124G.

Each signal combination received from the teleprinter consists of a start element of 20 milliseconds and five signal elements, each of 20 milliseconds' duration and a stop element of 30 milliseconds' duration i.e. a total duration of 150 milliseconds.

When a start element is received pulses appear on the conductor 1S and are applied to a gate 113G. The output of this gate is applied to one element ST of a two position switch 11F. This switch consists in one example of two gas filled discharge tubes interconnected so that firing of one tube puts out the other tube. The two tubes are denoted ST and SP and conductors shown as inputs to each element so that the tubes are fired when potentials are applied over the respective conductors. Tube SP is normally fired; this causes positive potential to be present on conductor 11fSP which constitutes a second input to gate 113G. Gate 113G is therefore opened and tube ST of 11F is fired, thus providing a potential on the input to a gate 112G marked 11fST. Pulses from —P thus pass to the counting circuit 12C and are counted thereby. (The counter 12C represents the time scale for the received telegraph signals.)

In order to guard against a false start condition the incoming mark conductor 1M is examined after the lapse of 8 milliseconds by means of the conductor 12C8 on which potential appears at that time. Conductor 12C8 supplies an input to gate 124G. This gate requires two inputs to open it and if the switch over of 11F was due to a true start element there will be no potential on conductor 1M at this time and gate 124G remains closed. If, however, the switch over was due to the momentary appearance of a start condition on the line from the teleprinter the line condition will have returned to mark and there will be potential on conductor 1M. Gate 124G is opened and tube SP is fired, tube ST thereby being extinguished. A pulse appears on conductor 11ft returns the time scale circuit 12C to zero. (An output is given in 11ft wherein the condition of 11F is changing over.) Arrangements for rejecting a too-short start period in this manner are claimed in British Patent No. 692,457, issued September 21, 1953.

*Storing of incoming signal combinations*

The condition of the conductor 1S is examined in the middle of each of the five code elements of the combination by means of gate circuits 114G and 117G to which potentials are applied from counter 12C at from counter 12C 30, 50, 70, 90 and 110 milliseconds from the start of the time scale circuit 12C. The times at which potential appears at the aforementioned gate circuits is indicated by the pairs of digits 30, 50, 70, 90 and 110 which follow the reference character 12C. Gates 114G and 117G are three-input gates as denoted by the numeral 3 within the circles. Which of these gate circuits is to be opened at these times depends upon a two element counter circuit 13C. This counter circuit is initially in the condition in which element 1 thereof is conducting and thus potential 13C1 is applied at this time to gate 114G. When there is an incoming space element in the received combination there are positive pulses on conductor 1S and gate 114G is opened to allow a pulse to be applied to an element 5 of a storage circuit 11R.

This storage circuit 11R consists of a non-cyclic chain of five cold cathode gas filled tubes interconnected in the manner described in U.S. Patent No. 2,649,502, granted August 18, 1953. The non-cyclic character of the chain is indicated by a circular appendage to the right hand block (1) in the chain.

A pulse applied through gate 114G to tube 5 of this chain 11R serves to fire this tube, so that the tube is fired if the first intelligence element of the incoming code combination is a space and left unfired if the first element is a mark.

At a time 40 milliseconds after the start of time scale 12C potential is applied to gate 115G from time scale circuit 12C and as counter circuit 13C also applies potential to this gate over conductor 13C1, gate 115G opens and applies a potential to gate 116G. Pulse +P from the same source as those denoted —P is also applied to gate 116G and when this gate is opened the pulse steps the pattern on register 11R one step.

The incoming code combination is registered in the register 11R, the condition of the successive elements of the code combination being registered on tube 5 (fired for a space, left unfired for a mark) at 30, 50, 70, 90 and 110 milliseconds and the pattern stepped on at 40, 60, 80 and 100 milliseconds, so that after 110 milliseconds from the start the five elements of the incoming code combination are left stored in the tubes 1 to 5 of the pattern register 11R.

At a time 139 milliseconds after the start of time scales 12C potential is applied to gate 122G so that a pulse is passed to counter 13C to cause element 2 thereof to become conducting and element 1 to cease to conduct. At the same time (139 milliseconds) conductor 12C139 through gate 125G fires the SP element of the two element switch 11F thus causing the ST element to be extinguished. A momentary pulse is given by the changeover over conductor 11ft restoring time scale circuit 12C to zero.

When the next character is received the same cycle of events is repeated but as the counter 13C is now in the condition in which element 2 thereof is energised, the examination of the code elements takes place by means of gate 117G, which has an input 13C2 applied thereto and at times 30, 50, 70, 90 and 110 milliseconds after the commencement of the second cycle of counter 12C and providing a space signal is present on lead IS, gate 117G will open and the elements are stored in a multi-pattern register 12R similar in all respects to 11R. The pattern on register 12R is stepped by pulses applied over gates 118G and 119G.

Control of transmission

The transmission of the stored combinations and the derivation and transmission of the check elements are performed under the control of the continuously running time scale circuit 11C and a multi-position switch 31F (Fig. 3) acting as a distributor. This multi-position switch 31F is of a known type and consists, for example, of a number of gas tube elements so connected that when one is fired the others are extinguished. It is normally in the condition in which element 1 is conducting.

As soon as the time scale 11C is started up, trnasmission of a preliminary condition over the radio link commences, this preliminary condition serving to start up the time scale circuit at the receiving end of that link.

The application of signalling conditions to the outgoing circuit is controlled by a two position switch 32F (Fig. 3) having two positions denoted M and S. This switch serves when M is conducting to impress marking potential and when S is conducting to impress spacing potential on the outgoing circuit.

When time scale circuit 11C reaches position 0, a gate 316G is opened (switch 31F being in position 1). Through gates 317G and 318G switch 31F is driven into position M, if not already in that position, to cause a marking condition to be transmitted. At times 19.8, 39.8, 59.8 and 79.8 milliseconds, counter 11C restores, switch 32F is restored to position S but in each case it is restored to position M at 0.2 millisecond later, i.e. at times 20, 40, 60, 80 milliseconds by the opening of gate 316G. At 99.8 milliseconds switch 32F is again driven into position S and it now remains in that position until gate 316G is again opened at 0 millisecond in the next cycle.

This succession of events continues until it is required to send out characters and the transitions from mark to space at 99.8 milliseconds and from space to mark at 0 millisecond serve to start up the time scale circuit at the distant end in the manner described in the British Patent No. 771,302, issued July 17, 1957.

When the second combination of a pair of received combinations is being received, i.e. when counter 13C is in position 2, potential is applied to a gate 311G. At 9 milliseconds in the second cycle of 12C a second potential is applied to this gate and a third potential is applied over 31F. The gate is opened and switch 31F is driven to position 2.

It will be noted that in this position gate 316G continues to be opened at times 20, 40, 60, 80 milliseconds in the cycle of 11C if 31F is in position 2.

At any subsequent time when counter 11C reaches 144 milliseconds a gate 312G is opened and switch 31F is driven into position 3. The condition of element 1 of register 11R influences gate 326G. If a space is registered thereon gate 326G is opened, and at time 0 in the cycle of counter 11C, gate 316G is opened, gates 317G and 318G are also opened and the two position switch 32F changed over to cause element M to be conducting to cause a mark to be transmitted. Thus the condition mark or space of a received element is reversed for transmission.

At time 10 milliseconds in the time scale of counter 11C, gate 120G is opened (since potential is also applied thereto over 31f3) and potential is applied to open gate 116G to pulses from the source +P so that the pattern in register 11R is stepped on. At time 19.8 milliseconds in time scale of counter 11C switch 32F is switched over to space. At time 20 milliseconds, potential is again applied to gate 316G to examine the new condition of element 1 of the pattern register 11R, and if this registers a space, switch 32F is again changed over to send a mark. Otherwise a space continues to be sent.

The process of sending out the elements of the combination stored in the pattern register 11R continues in the same way, the pattern in the register being stepped at 30, 50 and 70 milliseconds in the time scale of counter 11C, switch 32F being placed in space condition if not already there at 39.8, 59.8 and 79.8 milliseconds in this time scale and the condition of element 1 of pattern register 11R being examined at 40, 60 and 80 milliseconds in this same time scale.

At 80 milliseconds in the time scale of counter 11C, potential is applied to gate 313G to which potential is also applied when switch 31F is in position 3. Gate 313G is opened and switch 31F is driven into position 4.

It will be noted that during the sending out of the first five elements, the gate 115G is inhibited from being opened by potenial on 31f3 (the circle about the arrowhead indicating that a potential appearing upon the encircled input, prevents the gate from opening); and so the pattern in the register 11R cannot be stepped from the time scale circuit 12C. This is to prevent two stepping pulses being applied to the pattern register between the examination of two successive conditions of element 1 of the register as might otherwise occur when a subsequent code combination is being received during the period of transmission.

Derivation of check elements

The check elements are set up on counters 21C, 22C, 23C and 24C (Fig. 2). These are two-element counters and the number of spaces in a certain combination of the elements stored on registers 11R and 12R is counted on each of these counters. There are ten elements stored in these registers, and each of these elements effects a different combination of counters. The counters 21C . . . 24C are operated from the elements of registers 11R and 12R that register spaces through respective gates 211G, 212G, 213G and 214G.

The gates 201G . . . 210G are controlled at different times in the cycle of counter 11C and each gate is also controlled by a separate element of the registers 11R and 12R. If the element concerned represents a space, the corresponding gate of the gates 201G . . . 210G is opened at the appropriate time and a combination of the gates 211G . . . 214G is thus opened, provided switch 31F is in condition 3 or 4 (i.e. sending of the character of a pair is in process). Gates 211G . . . 214G provide inputs to the counters 21C, 22C, 23C, 24C respectively, It will be seen that each of the counters 21C . . . 24C counts the number of spaces in a different set of 6 elements and each of the elements affects a different set or combination of counters as shown below:

| Counter | Elements | |
|---|---|---|
| | 11R | 12R |
| 21C | 1, 2, 3, 4, 5 | 1, |
| 22C | 1,    4, 5 |    2, 3, 4, |
| 23C |    2,    4, | 1, 2,    4, 5 |
| 24C |       3,    5 | 1,    3, 4, 5 |

The counters count spaces in the binary system so that if the number of spaces is odd the element 1 of the counter is left operated and if the number of spaces is even or zero the element 0 of the counter is left operated.

The last element to be counted on counter 21C affects that counter at 95 milliseconds in the time scale of 11C.

*Transmission of check elements*

The condition of element 0 of counter 21C is examined at 100 milliseconds in the cycle of 11C by gate 319G, 32F having been placed in condition to send space at 99.8 ms. If counter 21C registers an even number so that element 0 thereof is operated gate 319G is opened, followed by the opening of gates 317G and 318G and switch 32F is operated to send a mark. If counter 21C registers an odd number, a space continues to be sent. Thus the check element is, like the character elements, reversed in kind.

Similarly at 120 milliseconds in the cycle of counter 11C the condition of element 0 of counter 22C is examined by gate 320G and gates 317G and 318G opened if required to cause switch 32F to send a mark.

At 144.8 milliseconds in the cycle of counter 11C, switch 32F is restored to space condition preparatory to reading the condition of the element 1 of the register 12R.

At 144 milliseconds in the cycle of counter 11C, element 5 of switch 31F is operated over gate 314G.

*Transmission of second character*

At times 0, 20, 40, 60 and 80 milliseconds in the next cycle of counter 11C, the condition of element 1 of the register 12R is examined over gate 321G, 32F having in each case been switched over to space 0.2 millisecond previously. If element 1 of register 12R registers a space at any of these examination times a pulse is passed forward over gates 322G 318G to switch 32F to send a mark. The register 12R is stepped between each examination time at 10, 30, 50 and 70 milliseconds in the cycle of counter 11C over gates 121G and 119G.

*Transmission of second pair of check elements*

At a time 80 milliseconds in this cycle of counter 11C, potentials are applied to open gate 315G and switch 31F is switched into the condition with element 6 operated. In this condition counter 23C is examined at a time 100 milliseconds in the cycle over gate 323G and counter 24C is examined at a time 120 milliseconds over gate 324G and two further check elements are transmitted.

It will be noted that the last element transmitted in a cycle of counter 11C is of 25 milliseconds duration i.e. the difference between 120 milliseconds at which the last element is examined and 145 milliseconds (or 0 milliseconds) when the first element in the next cycle is examined.

It will also be noted that the sequence of events depends upon timing from the two time scale counter circuits 11C and 12C. The former is a continuously running time scale, the principal function of which is to time the transmission of the elements by means of the distributor switch 32F over a synchronous channel. The time scale counter 12C on the other hand is started and stopped in dependence upon the signals received from a teleprinter. There can thus be no necessary phase relation between the two time scales. The arrangements described are, however, such that no signals are lost due to this absence of phase relation as will now be made clear.

The most difficult condition to meet is that in which the start-stop combinations are received without any break as may happen if these signals come from a tape controlled transmitter.

*Immediate transmission of a pair of characters*

The sequence of events may be followed from Fig. 4.

The time scale of counter 12C is shown on the left, that of 11C on the right and it is assumed that combinations are sent in continuously from the teleprinter. For the purposes of illustration a relation between the phases of the two time scale circuits has been taken in which the transmission of the first character registered in 11R takes place with very small delay after the registration.

During the first cycle of counter 12C shown the registration of a first character in register 11R takes place and at 139 milliseconds switch 13C is driven to 2. The time scale circuit 12C runs for 140 milliseconds and remains in position 0 during a further 10 milliseconds of the stop period of the teleprinter (assuming a stop period of 1½ signal elements). The time scale circuit 12C starts again when a new start element arrives, and at 9 milliseconds in this second cycle 31F is driven from 1 to 2.

The time scales are shown as so related that counter 11C reaches 144 milliseconds very shortly after so that counter 31F is driven to 3 and sending out of elements can commence.

During the following concurrent running of the two time scale circuits a second character is registered in register 12R under control of counter 12C, the register 12R being stepped by counter 12C, whilst the first character is sent out from register 11R; register 11R being stepped from 11C.

At a time 80 milliseconds in the cycle of the counter 11C, counter 31F is driven to position 4 and at 100 and 120 milliseconds two check elements are sent out, derived from switches 21C and 22C respectively.

In the meantime switch 13C is driven back to position 1 at a time 139 milliseconds in the cycle of counter 12C and subsequently counter 31F is driven to position 5 at a time 144 milliseconds in the cycle of counter 11C.

In the next partially concurrent cycles of counters 12C and 11C, a third incoming character is registered on register 11R whilst the five elements previously registered on register 12R are transmitted. At a time 80 milliseconds in the cycle of counter 11C, counter 31F is driven to position 6 and two check elements derived from switches 23C and 24C respectively, are sent out at times 100 and 120 milliseconds. At a time 124 milliseconds in the cycle of counter 11C, counter 31F is driven to position 1. At a time 139 milliseconds in the cycle of counter 12C, counter 13C is driven to 2.

If a fourth character appears very rapidly counter 12C may reach its position 9 before counter 11C reaches its 144th position (corresponding to 144 milliseconds in its cycle) and in that case counter 31F is driven to position 2 at a time 9 milliseconds in the cycle of counter 12C and to position 3 at 144 milliseconds in the cycle of counter 11C and the cycle of registering two characters and sending them on with added check elements can recommence. But as the cycle of a transmitted character (145 milliseconds) as measured by counter 11C is less than that of a character received from a teleprinter (150 milliseconds) and thus of the effective length of the cycle of counter 12C a further cycle of counter 11C may follow before counter 31F is driven to its position 3.

*Delayed transmission of a pair of characters*

This state of affairs is illustrated in Fig. 5. The time scale counter 12C is shown on the left and 11C on the right as before. It is supposed that the times shown at the top of the time scale 12C are those at the end of a cycle during which a character has been registered in register 11R. At a time 139 milliseconds in that cycle of 12C, counter 13C is driven to position 2. Time scale counter 11C is shown in such a relation to time scale counter 12C that 144 milliseconds in the cycle of counter 11C is reached before counter 12C reaches 9 milliseconds in a second cycle. At the last mentioned time counter 31F is driven to its position 2.

As the transmission of signal elements is under control of counter 31F in positions 3 and 4, a full cycle of counter 11C must now elapse before any character transmission can take place. During this cycle 5 marks and two spaces are sent as described above. During the concurrent cycle of counter 12C a second character is registered in register 12R.

When counter 11C reaches 144 milliseconds in its cycle, counter 31F is driven into position 3 and during the immediately succeeding cycle the condition of element 1 of register 11R is read at times 0, 20, 40, 60 and 80 milliseconds on counter 11C, and during the same period a new character may be registered in register 11R under the control of counter 12C.

As will be seen from Fig. 5 no confusion arises. At time 0 in the cycle of counter 11C the condition of element 1 of register 11R controls transmission and at time 10 milliseconds register 11R is stepped. At time 20 milliseconds the new condition of element 1 of register 11R is read and at 30 milliseconds register 11R is stepped.

As shown in Fig. 5, the first element of a received character is entered into element 5 of register 11R at a time 30 milliseconds on in the cycle of counter 12C, this element of register 11R being ready to receive an incoming character element because its previous recording has been transferred to element 4 of register 11R by the stepping effected at a time 10 milliseconds in the cycle of counter 11C.

It may be that the condition of element 1 of register 11R has been read twice by counter 11C before a new character element is registered in element 5 of register 11R. No confusion can arise, however, because the stepping of register 11R must be effected at least once under control of counter 11C and position 3 of counter 31F before any element is registered in register 11R from the incoming teleprinter signals.

As shown in Fig. 5, in the conditions there envisaged, four steps of register 11R are effected under control of counter 11C until at a time 80 milliseconds in its time scale, counter 31F is driven to position 4. When counter 31F has passed out of position 3, control of the stepping of register 11R passes to the time scale 12C and at 100 milliseconds on that time scale a further step is given to register 11R to allow of the fifth element of the incoming character to be registered in the fifth element 11R5 of register 11R at 110 milliseconds.

With counter 31F in position 4 two check elements are sent under control of time scale 11C at 100 and 120 milliseconds, at 144 milliseconds counter 31F is driven to position 5 and in that position the transmission of the five elements stored in register 12R takes place at times 0, 20, 40, 60 and 80 milliseconds in the time scale of counter 11C, the register 12R being stepped at 10, 30, 50, 70 milliseconds in the time scale of 11C by stepping pulses applied over gate 121G.

Whilst register 12R is being stepped under control of counter 11C, a fourth character incoming from the teleprinter is being registered on register 12R under control of time scale 12C but stepping of register 12R by said time scale is inhibited whilst counter 31F is in position 5, gate 118G being inhibited from opening by potential applied over 31/5.

At a time 80 milliseconds in the time scale of counter 11C, counter 31F is driven into position 6 so that register 12R is no longer stepped under control of counter 11C but is stepped at times 80 and 100 milliseconds of the time scale of counter 12C.

At times 100 and 120 milliseconds in time scale of counter 11C, two further check elements are sent out to complete the second seven-element combination transmitted.

At a time 124 milliseconds in time scale of counter 11C, counter 31F is driven into position 1. In order to prevent any further delay in transmission, provision is made to drive counter 31F into position 2 at 130 milliseconds in the time scale of counter 12C over gate 311G if, as in the present case counter 13C is in position 2 and counter 12C has gone beyond 9 milliseconds. Consequently counter 31F can be driven into position 3 at a time 144 milliseconds in the time scale of counter 11C and the immediately succeeding two cycles of counter 11C can control the transmission of a further two characters now stored in registers 11R and 12R.

Some disturbance could arise if gate 120G were to open to allow register 11R to be stepped at the same instant as gate 114G is opened for an element to be registered in stage 5 of register 11R. This possibility is eliminated by providing means for returning counter 11F to the condition in which SP is conducting whenever counter 12C starts in an inappropriate relationship to counter 11C. Thus if at a time 0.2 millisecond in the cycle of counter 12C coincides with 0.2, 20.2 or 40.2 milliseconds in the cycle of counter 11C, gate 123G is opened passes forward a condition to open gate 125G and SP of switch 11F is made conducting. The temporary condition on 11ft as the switch 11F changes over restores counter 12C to initial position but as the spacing condition on conductor 15 still persists, ST of counter 11F is immediately afterwards again made conducting and time scale circuit 12C restarted with a loss of 0.2 millisecond only.

The transmission of marking and spacing conditions by means of switch 32F may be used to key a radio transmitter or in any appropriate manner to cause the marking and spacing conditions to be transmitted to the circuits of Figs. 6 and 7.

The time sequence of the circuits of these figures are governed by the time scale circuit 61C which runs continuously, being driven by pulses from a source —P applied to the time scale or counting circuit 61C over gate 601G. Gate 601G is shown as requiring two inputs to cause an output to be applied to counter 61C.

The means closing the lead mark Sync to start the time scale circuit 61C in synchronism with the time scale circuit 11C and for keeping it running in synchronism are described in British Patent 771,302, previously referred to. These means are denoted diagrammatically in Fig. 6 by the line marked Sync denoting a second input to gate 601G.

*Receiving and Storing characters and check elements*

The marking and spacing conditions determined by detection of the signals received over the radio channel are applied in the manner described in U.S. Patent 2,787,657, already referred to, to a demodulator which causes positive pulses from a local source (in this case the same source as supplies negative pulses —P to gate 601G), to appear on respective mark and space leads. The space lead is denoted 6S in Fig. 6 and is connected as an input to each of the gates 602G and 607G. Which of these gates is open depends upon the condition of a three element counter 62C. Initially this counter is in the condition of element 1 thereof conducting. In this condition gate 602G is opened if a pulse is on lead 6S at times 10, 30, 50, 70, 90, 110 or 130 milliseconds in the time scale 61C.

When gate 602G is opened a spacing condition is registered in the left hand element 7 of a seven element pattern register 61R. This register is similar to registers 11R and 12R at the other end of the synchronous channel. The pattern register 61R is stepped by the opening of gate 603G at times 2, 22, 42, 62, 82, 102 and 122 milliseconds in the time scale of counter 61C.

Thus the five intelligence elements of a character and the two check elements received during a cycle of the time scale 61C are registered in the pattern register 61R.

At a time 141 milliseconds in the cycle of counter 61C, gate 605G is opened (since it receives an input from 62C1 and another from 61C 141) and the counter 62C is driven into position 2.

During a cycle of counter 61C the condition of the space lead 6S from the demodulator is examined by gate 606G and if a space is being received at any of the times 10, 30, 50, 70 or 90 milliseconds in the time cycle of counter 61C, gate 606G is opened and the switch 61F is driven into position 2. This indicates that a character has been received during the cycle since in every teleprinter combination there is at least one mark condition transmitted over the synchronous channel as a spare condition.

With switch 61F in position 2 gate 604G is opened at a time 142 milliseconds in the time cycle of counter 61C and the counter 62C driven into position 3.

At a time 143 milliseconds in the cycle of counter 61C, switch 61F is reset into position 1.

*Registration of a second combination*

With counter 62C in position 3, the condition of the space lead 6S from the demodulator is examined over gate 607G instead of over gate 602G, and the first five elements of the second combination received are registered in register 62R. Register 62R is stepped over gate 608G at times 2, 22, 42, 62 and 82 milliseconds in the time scale of counter 61C. If a spacing condition causes pulses to appear on lead 6S at times 10, 30, 50, 70 and 90 milliseconds in the time scale of counter 61C, a space is registered on element 5 of register 62R. Immediately after examination of the lead 6S for each of the first four elements the pattern on register 62R is stepped on and the final result is that the first five elements of the combination are left registered in elements 1 to 5 of register 12R.

*Registration of check elements, generation of new check elements and comparison*

As previously described, the combinations are transmitted in pairs, the last two elements of each combination being check elements.

At the receiver the action is effectively that of registering the check elements, generating new check elements for comparison therewith and comparing the two sets of check elements but the several steps are combined together by means of counters 63C, 64C, 65C, 66C.

At a time 92 milliseconds in the time scale of counter 61C during which the second combination of a pair is received i.e. shortly after the fifth element has been entered into register 62R, the counters 63C . . . 66C are restored to normal condition, with element 1 of each conducting, over gate 627G (counter 62C being in position 3).

Each of the counters 63C . . . 66C is operated by a combination of received and registered elements corresponding to a combination of elements used at the transmitter for generating the check elements to influence the transmitter. The original check elements are generated in dependence upon whether the number of spaces in a certain combination of the significant elements of two teleprinter combinations is odd or even. As each check element is derived from six combination elements, an even number of mark elements corresponds to an even number of space elements and therefore the check elements derived from the received combinations should be the same as the corresponding check elements derived from the combinations before transmission. The check elements transmitted are however reversed so that a mark is sent as a space and vice versa. It is for this reason that the normal condition of each of the counters 63C . . . 66C is with element 1 thereof conducting.

Counters 63C . . . 66C are operated over gates 609G to 618G at various times from times 94 to 103 milliseconds in the time scale of counter 61C.

Counter 63C is operated over gates 609G and 619G at a time 94 milliseconds in the cycle of counter 61C by an output 61R1 from register 61R; at 95 milliseconds over gates 610G and 619G from stage 61R2; at 96 milliseconds over gates 611G and 619G from stage 61R3; at 97 milliseconds over gates 612G and 619G from stage 61R4; at 98 milliseconds over gates 613G and 619G from stage 61R5; at a time 99 milliseconds in the cycle of counter 61C by an output 62R1 from register 62R over gates 614G and 619G.

As counter 63C started from position 1 its condition should represent the reversal of the condition of counter 21C and should therefore agree with that of the check element registered in stage 61R6 of register 61R; i.e. if counter 21C was in position 0, counter 63C should be in position 1. If counter 21C was in position 0 a mark would have been sent as the sixth element of the first combination and nothing be registered in stage 61R6 of register 61R. At a time 110 milliseconds in the time scale of counter 61C counter 63C is operated over gate 623G by the condition of stage 61R6. If a mark is registered on stage 61R6 counter 63C is left in position 1.

If on the other hand counter 21C was in position 1 a space would be transmitted as the sixth element, and would be registered in stage 61R6 and counter 63C is given a further step at 110 milliseconds into position 1.

In either case, therefore, counter 63C being in position 1 is an indication that the check element received is in agreement with the check element generated from the received signals. If, on the other hand counter 63C is in position 0 there is disagreement and there must be correction of the received elements. The manner in which this correction is effected is described hereinafter.

Counter 64C is set from stages 61R1, 61R4, 61R5 of register 61R and stages 62R2, 62R3 and 62R4 of register 62R and should be the reverse of that of counter 22C. If counter 22C was in position 1, a space is registered in stage 61R7. At a time 130 milliseconds in the cycle of counter 61C counter 64C is operated over gate 624G from 61R7 stage.

Counter 65C is set from 61R2, 61R4, 62R1, 62R2, 62R4 and 62R5 of registers 61R and 62R, respectively, and its setting should be the reverse of that of counter 23C. If counter 23C is in position 1, the sixth element of the second combination received is spacing and at 110 milliseconds in the time scale of counter 61C i.e. the middle of the period during which this element is received the condition of lead 6S from the demodulator is examined over gate 625G and counter 65C operated accordingly.

Counter 66C is set from stages 61R3, 61R5, 62R1, 62R3, 62R4 and 62R5 of registers 61R and 62R, respectively, and its setting should be the reverse of that of counter 24C. If counter 24C was in position 1, a space is transmitted as the seventh element of the second combination. At 130 milliseconds in the time scale of counter 61C, i.e. in the middle of the period in which the last check element is received the condition of the lead 6S affects counter 66C over gate 626G.

It will be noted that it is not necessary to register the sixth and seventh elements of the second combination in register 62R and thus this register is only a five-element register instead of a seven element register like register 61R.

*Retransmission to teleprinter (Fig. 7)*

The retransmission to a local (or distant) teleprinter is controlled by a two element counter 71C. The two positions of this counter are denoted M and S and the outputs therefrom are connected to any suitable device by which the appropriate voltage may be applied to a line connected to a teleprinter.

Before a message starts but after counter 61C has started up, counter 71C is restored to position S at 0.8 millisecond and so sends a space to the teleprinter. This space continues for 100 milliseconds until, at 100.8 milliseconds in the cycle of the counter 61C, counter 71C is restored to mark.

If a character has been received during a cycle as denoted by switch 61F having been driven to position 2, a gate 701G is opened at a time 126 milliseconds in the cycle of counter 61C. The output from this gate provides an input to gate 702G which in turn provides one input to gate 703G. Gate 703G is opened on the occurrence of a pulse —P and steps counter 71C to space. A spacing condition is again transmitted, this time for 119.8 milliseconds in the cycle of counter 61C, i.e. until 100.8 milliseconds when counter 71C is restored to mark condition by the output 61C 100.8 of counter 61C. The mark condition continues until 0.8 millisecond in the next cycle of counter 61C when counter 71C is restored to spacing condition.

The above cycle of events is altered when a received signal element has caused stages 61R1 or 62R1 to be fired. The condition of stage 61R1 of register 61R or 62R, respectively, is examined over gate 704G and that of stage 62R1 over gate 705G. During a first cycle of counter 61C during which a combination is registered in register 61R, the counter 62C is in position 1, and in that position supplies one condition for opening gate 704G. The condition of the first signal element is not, however, registered in stage 61R1 until after the stepping of register 61R at a time 122 milliseconds in the cycle of counter 61C. In the next cycle of counter 61C, a second signal combination is received and registered on register 62R with counter 62C in position 3 but again the first element of the combination does not influence stage 62R1 until after 82 milliseconds. It will be seen that gates 704G, and 705G are not opened during those two cycles.

During the third cycle, however, when counter 62C has been again stepped to position 1, the condition of stage 61R1 is examined at times 1, 21, 41, 61 and 81 milliseconds in the cycle of counter 61C over gate 704G. Any spacing element found registered in stage 61R1 at those times will cause the opening of gate 704G followed by the opening of gate 702G, which supplies an input to gate 703G to allow a pulse from —P to step counter 71C into position M to cause a mark to be sent thus compensating for the reversal of the signal elements over the synchronous channel. At times 0.8, 20.8, 40.8, 60.8 and 80.8 milliseconds in the cycle of counter 61C counter 71C is restored to position S if it had been stepped out of it preparatory to the examination by gate 704G.

During the next following cycle the successive conditions of stage 62R1 are examined in a similar manner over gate 705G.

In the intervals between the examination of the condition of stages 61R1 or 62R1 as the case may be, the register 61R or 62R is stepped over gate 603G or 608G.

It will be seen that in the case of the sending of a combination by counter 71C to a teleprinter, a start element commences to be sent at 126 milliseconds in the cycle of counter 61C preceding that in which a combination is sent and counter 71C is restored to mark condition at a time 100.8 milliseconds in the cycle of counter 61C for the stop element.

Before transmission of characters to the teleprinter commences and during any pause in such transmission due to combinations not being registered in register 61R or 62R, all space combinations are sent to the teleprinter.

*Correction of signal elements*

If one of the character elements has been incorrectly received this will be indicated by a comparison of the received character elements with the received check elements indicated by the position of the counters 63C to 66C. If each of these counters as in position 1, as previously explained, the character elements have been correctly received, but if an error has occurred some of these counters will be in position 0. In this latter case an additional impulse is given to the counter 71C to correct the error.

For example if the first element has been incorrectly received counters 63C and 64C, both of which are dependent upon this first element, will each be in position 0. In this case at 1.2 milliseconds in the time scale of counter 61C, gate 710G is opened and biasses an inlet to gate 706G. With counter 62C in position 1 and a switch 71F in position 1, gate 706G is opened and applies a bias to gate 703G which thus allows a pulse from the lead P to pass to counter 71C. If this counter is in position M it is steped to position S and if it is in position S it is stepped to position M thus correcting after an interval of 0.2 millisecond the first significant element to be transmitted.

Similarly each of the counters 63C and 65C being in position 0 indicates that there is an error in the second element, gate 711G is then opened at 21.2 milliseconds followed by the opening of gates 706G and 703G to give an additional step to counter 71C for the second element.

The third, fourth and fifth elements are similarly corrected; the third by the opening of gate 712G at 41.2 milliseconds; the fourth and fifth by the opening of gates 713G and 714G respectively.

The application of a correcting impulse is dependent also on how many of the counters 63C to 66C are in position 0. If one signal element is incorrectly received at least two of the counters should be in position 0. If only one of the counters is in position 0 it is assumed that it is the check element that has been incorrectly received and no correction is made.

If two and only two of the counters indicate that correction is required then correction by means of gates 710G, 711G and 712G is allowed but if more than 2 counters indicate errors then the correction is not permitted.

This is accomplished by means of a switch 71F. This is normally reset into position 1 at 92 millisecond of the time scale of counter 61C, in a cycle following one in which a code combination is received (i.e. if counter 62C is in position 3). This resetting is performed by the opening of gate 720G. If three out of the four counters 63C to 66C are in position 0 the gate 721G is opened and biasses gate 722G. In these conditions gate 722G opens at 131 milliseconds in the same cycle and switches 71F to position 2. With 71F in position 2 instead of position 1 gate 706G cannot be opened.

On the other hand an error in any of the fourth or fifth elements affects three of the counters 63C to 66C and accordingly the additional impulses required to correct such error are dependent upon switch 51F being in position 2. Thus if counters 63C, 64C and 65C are each in position 0 gate 713G is opened at 61.2 milliseconds in the time scale of counter 61C and then gate 707G is opened if counter 62C is in position 1 and switch 71F in position 2. Gate 703G thereupon passes an impulse to counter 71C to correct the third element.

Similarly the fifth element is corrected at a time 81.2 milliseconds in the cycle of counter 61C over gates 714G, 707G and 703G.

If each of the four counters 63C to 66C is in position 0 gate 723G is opened and at a time 132 milliseconds in the cycle of counter 61C gate 724G is opened to drive switch 71F into position 3. With switch 71F in this position no error correction takes place because there must be more than one signal element faulty.

Correction of errors in the five significant elements of the following combination sent to the teleprinter takes place in a similar manner. An additional impulse for correction of these elements is dependent upon the opening of the following gates:

1st element 715G, 708G
    2nd element 716G, 709G
    3rd element 717G, 709G
    4th element 718G, 708G
    5th element 719G, 709G While the principles of the invention have been described above in connection with a specific embodiment it is to be clearly understood that this description is made only by way of example and not as a limitation on the scope of the invention.

It is clear, for example, that the reversal in kind of signal elements for transmission over the synchronous channel is not an essential part of the invention, although useful in the particular embodiment chosen for illustration, and that it is possible to reverse only a part of the elements or to transmit all elements unreversed.

In the appended claims the expression "numerical characteristic" of a number means the "odd" or "even" character of such number.

What we claim is:

1. Telegraph system using character code signal combinations of two signalling conditions only (mark and space) which comprises at a transmitting station means for deriving from a plurality of first intelligence bearing signal combinations a plurality of check elements the kind (mark or space) of each of which is indicative of a numerical characteristic of the total number of marks and spaces contained in a predetermined set (this is a combination) of elements in said intelligence bearing signal combinations which set is different for each check element, means for transmitting a plurality of second signal combinations equal in number to the number of said plurality of intelligence bearing signal combinations, each of said second signal combinations consisting of a plurality of elements of number equal to those in one of said first intelligence bearing signal combinations and dependent thereon together with a part of said check elements, and at a receiving station means for automatically determining the relation between the marks and spaces in the respective sets of elements of the received combinations corresponding to those of the transmitted combinations from which the respective transmitted check elements were derived and for automatically correcting an element of the said received combinations in accordance with discrepancy between the relations so determined and the received check elements.

2. Telegraph system using combinations of two signalling conditions only (mark and space) which comprises at one station means for storing the intelligence bearing elements of a pair of teleprinter signal combinations, means for deriving from the relation between the marks and spaces in different predetermined sets (that is, combinations) of said elements four check elements, the sets from which the check elements are derived being different and each intelligence bearing element affecting a different check element, means for transmitting over a synchronous channel pairs of seven element combinations each of which is dependent upon one of said teleprinter signal combinations and two check elements, means at a station at the receiving end of said synchronous channel for comparing the relation between marks and spaces in those elements of the pair of combinations that are dependent upon the original combinations with the check elements as received and for correcting an element in said pair of combinations in accordance with said comparison.

3. Telegraph system as claimed in claim 2 in which the seven element combinations transmitted over said synchronous channel consist of the five intelligence bearing elements of one of said pair of signal combinations with two check elements immediately following them.

4. Telegraph system as claimed in claim 2 in which said means for deriving said check elements comprises a corresponding number of two condition counters and means for stepping each said counter at successive times by successive elements of a given kind contained in a respective one of said sets of elements.

5. Telegraph system as claimed in claim 4 comprising at the receiving station a number of further two condition counters, and means for stepping each of said further counters at successive times by successive elements of a given kind contained in one of a set of received elements corresponding to elements that have been used to set a corresponding one of said first mentioned two conditions counters and by an element corresponding to a received check element of said given kind.

6. Telegraph system as claimed in claim 2 in which means is provided for taking combinations of said check elements two at a time and other combinations of said check elements three at a time to form a total number of combinations equal to the number of elements in said plurality of first signal combinations or in the intelligence bearing elements of said pair of teleprinter signal combinations as the case may be, said combinations of check elements being such that each element requiring to be checked goes to form each of the check elements in one such combination of check elements and does not influence the remainder.

7. Telegraph system as claimed in claim 2 in which means is provided for reversing in kind (mark or space) each element of the seven element combinations transmitted over said synchronous channel from the corresponding element in the teleprinter signal combination or from the corresponding check element as the case may be.

8. Telegraph system as claimed in claim 2 comprising at said one station a time base circuit, means for starting and stopping said time base circuit under control of said teleprinter combinations, means under control of said time base circuit for storing two of said teleprinter combinations at a time and for generating said four check elements, a second time base circuit continuously running, and means under control of said second time base circuit for controlling the examination of the stored teleprinter combinations and check elements and for controlling the transmission of said seven element combinations over said synchronous channel.

References Cited in the file of this patent

UNITED STATES PATENTS

| | | |
|---|---|---|
| 2,552,629 | Hamming et al. | May 15, 1951 |
| 2,596,199 | Bennett | May 13, 1952 |
| 2,653,996 | Wright | Sept. 29, 1953 |
| 2,708,267 | Weidenhammer | May 10, 1955 |